UNITED STATES PATENT OFFICE.

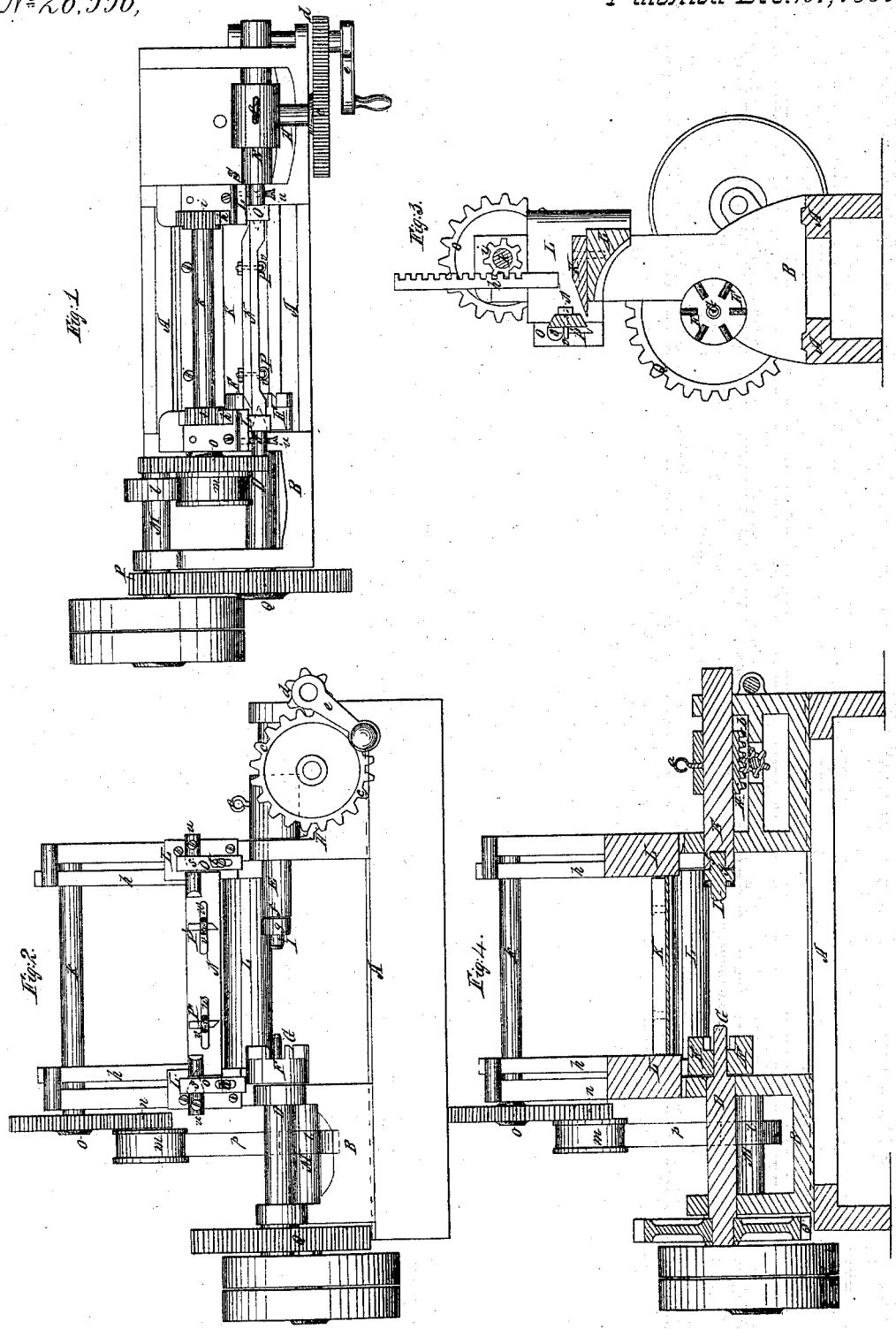

RUSSELL D. BARTLETT, OF BANGOR, MAINE.

VENEERING-MACHINE.

Specification of Letters Patent No. 26,556, dated December 27, 1859.

*To all whom it may concern:*

Be it known that I, RUSSELL D. BARTLETT, of Bangor, in the county of Kennebec and State of Maine, have invented an Improved Machine for Cutting Veneering or other Thin Strips of Wood from Logs or Cylinders; and I do hereby declare that the same is fully described and represented in the following specification and the accompanying drawings, of which—

Figure 1, is a top view. Fig. 2, a front elevation. Fig. 3, a vertical, central and transverse section of such machine.

In the said drawings, A, denotes the bed rails or supporting frame of the operative mechanism to be described, such part, A, being constructed like the bed rails of an ordinary turning lathe. The said part, A, supports a head stock, B, and a tail stock, which respectively carry two arbors, D, E, arranged with respect to one another as shown in the drawings. One of these (viz., D,) is the main driving arbor—while the other (E,) is the centering arbor. The said main arbor carries on its outer end, a dog or chuck F, and a centering point or center, G. The other or centering arbor has a rack, H, affixed to it by a clamp screw, $a$. A pinion, $b$, engages with the said rack and is put in operation by gears, $c$, $d$, and a crank, $e$, the whole being arranged as shown in the drawings and for the purpose of imparting to the arbor, E, an endwise motion either toward or away from the other arbor. The inner end of the centering arbor is furnished with a cylindrical socket, $f$, for the reception of a journal $g$, extending from a rotary center, I, formed as shown in Figs. 1, 2, 3, and more particularly as exhibited in longitudinal section in Fig. 4. This center fixes itself to a piece of wood when the latter is placed between the center and the chuck, F, of the driving arbor. The object of the said rotary center is to prevent displacement of the axis of the block during the operation of reducing the block by the main plane or cutter, K. The said cutter, K, is arranged in and supported by a carriage, L, so applied to the head and tail stocks as to be capable of being moved vertically between them by means of two racks, $h$, $h$, which engage with two pinions, $i$, $i$, affixed on a horizontal shaft $k$, arranged as shown in the drawings. The said shaft, $k$, receives rotary motion from a driving shaft, M, by means of two pulleys, $l$, $m$, and two gears, $n$, $o$, arranged as shown in the drawings, the said pulleys being supplied with an endless band, $p$, for transmitting motion from one to the other. The said driving shaft operates the main arbor by means of two gears, P, Q, applied to them respectively.

Directly in front of the main cutter, K, and somewhat above the same is a throat gage, N, which is supported in position by means of pivots, $s$, $s$, projecting into its two upper corners, and sustained in adjustable boxes, O, O, fastened to the cutter carrier by screws, $t$, $t$, extended through slots formed in the said bearings, O, O. Said pivots are applied to the boxes in such manner so as to be capable of being drawn out of or endwise in the same, so as to admit of the removal of the throat gage, the pivots being held in place by set screws, $u$, $u$, extending through them respectively and screwed against the cutter carriage. Furthermore, the throat gage supports two edge cutters P′, P, applied to it by means of clamps $v$, $v$, extending through slots, $w$, $w$, made in the gage.

By the above mode of applying the throat gage to the cutter carriage, we not only have the means of turning it out of the way of the cutter, K, preparatory to its reduction of the log to a proper state for the formation of veneering therefrom but we can at any time that it may be desirable to sharpen either the main or the edge cutters, move the throat gage upward so as to enable us to gain access to good advantage to the cutting edge of either of the said cutters.

In the operation of the machine, the main cutter carriage, while the main arbor and log are in revolution, will be regularly moved downward so as to cause the veneering to be taken in a spiral form from the block or log.

What I claim in the above machine is—

The application of the throat gage to the main and secondary cutters so that both the gage and secondary cutters can be turned upward away from the log under circumstances and for the purpose or objects substantially as set forth.

In testimony whereof, I have hereunto set my signature.

RUSSELL D. BARTLETT.

Witnesses:
R. H. EDDY,
F. P. HALE, Jr.